United States Patent [19]

Kim

[11] Patent Number: 5,448,700
[45] Date of Patent: Sep. 5, 1995

[54] METHOD AND SYSTEM FOR INTERFACING PC TO CD-ROM DRIVES

[75] Inventor: Dae Y. Kim, Seoul, Rep. of Korea

[73] Assignee: Goldstar Co., Ltd., Rep. of Korea

[21] Appl. No.: 958,520

[22] Filed: Oct. 8, 1992

[30] Foreign Application Priority Data

Oct. 9, 1991 [KR] Rep. of Korea .............. 17696/1991

[51] Int. Cl.⁶ ........................................... G06F 13/00
[52] U.S. Cl. .................... 395/310; 395/848; 395/438; 364/DIG. 1; 364/235.3; 364/236.1; 364/236.2; 364/243.3
[58] Field of Search ............... 395/325, 275, 250, 425; 369/32

[56] References Cited

U.S. PATENT DOCUMENTS

| | | | |
|---|---|---|---|
| 4,802,152 | 1/1989 | Markvoort et al. | 369/32 |
| 4,888,691 | 12/1989 | George et al. | 395/425 |
| 4,905,184 | 2/1990 | Giridhar et al. | 395/400 |
| 4,949,323 | 8/1990 | Yoshida | 369/32 |
| 4,975,829 | 12/1990 | Clarey et al. | 395/275 |
| 5,121,492 | 6/1992 | Saville, III et al. | 395/500 |
| 5,150,465 | 9/1992 | Bush et al. | 395/250 |
| 5,235,685 | 8/1993 | Caldara et al. | 395/325 |
| 5,257,391 | 10/1993 | Dulac et al. | 395/325 |

Primary Examiner—Jack B. Harvey
Assistant Examiner—Ayaz R. Sheikh
Attorney, Agent, or Firm—Ostrolenk, Faber, Gerb & Soffen

[57] ABSTRACT

A method and a system for interfacing a PC to CD-ROM drives wherein the PC as a host can perform a different job while one of the CD-ROM drives selected as a target prepares for data to be transmitted to the host PC, thereby resulting in an increase in the interfacing efficiency. The method comprises a target select step of allowing the host to select one of the CD-ROM drives as the target at a bus free state, a lo command generate step of generating from the host a command to be executed by the target, a bus free step of, if the generated command from the host contains a disconnect command, transmitting disconnect status data from the target to the host and then making an interface bus through which the host is connected to the target the free state so that the host can perform a different job while the target prepares for data to be transmitted based on the generated command from the host, a reselect step of informing the host that the target completes the preparation for the data to be transmitted so that the host reselects the same target, a data transmit step of, if the same target is reselected by the host at the reselect step or if there is no disconnect command at the command generate step, transmitting the data prepared based on the generated command from the host from the target to the host, and a step of transmitting status data.

10 Claims, 13 Drawing Sheets

| SEL | C/D | I/O | BSY | BUS STATE | DESCRIPTION |
|---|---|---|---|---|---|
| 1 | 1 | 1 | 1 | BUS FREE | NO INTERFACING |
| 0 | 1 | 1 | 1/0 | SELECT TARGET | HOST SELECT TARGET |
| 1 | 1 | 0 | 0 | COMMAND | HOST GENERATE COMMAND |
| 1/0 | 1 | 1 | 1/0 | RESELECT | TARGET SELECT HOST |
| 1 | 0 | 1 | 0 | TRANSMIT DATA | TARGET TRANSMIT DATA TO HOST |
| 1 | 1 | 1 | 1 | TRANSMIT STATUS DATA | TARGET TRANSMIT STATUS DATA TO HOST |

DC — { 0: DISCONNECT INHIBIT
       1: DISCONNECT PERMIT

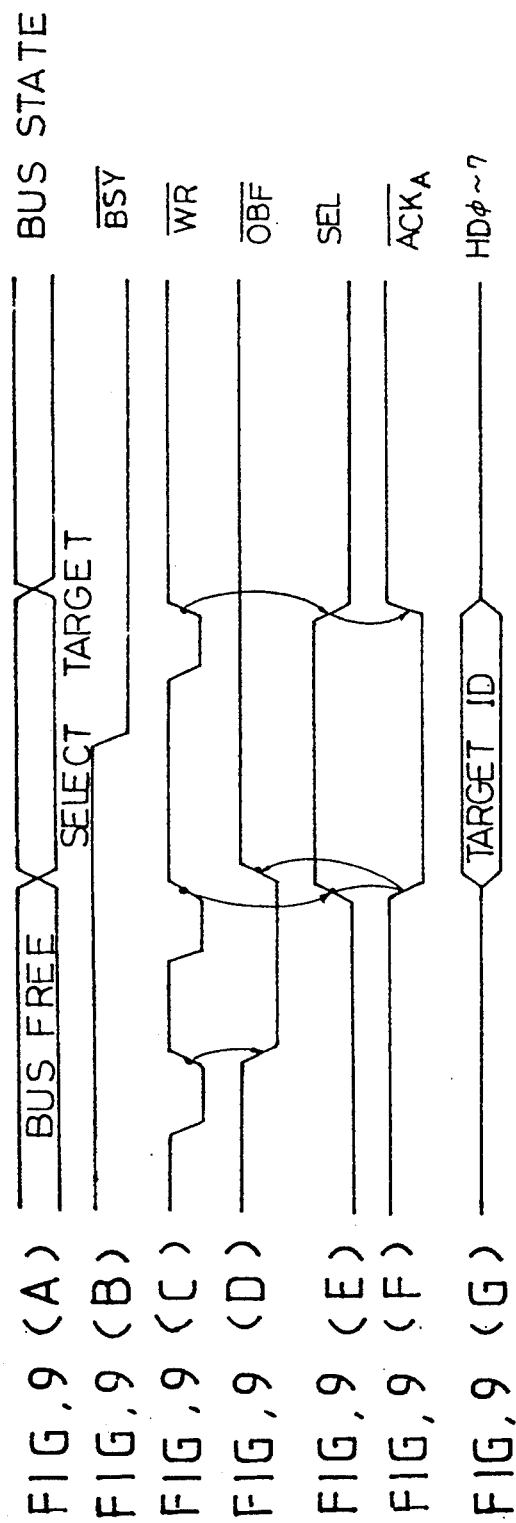

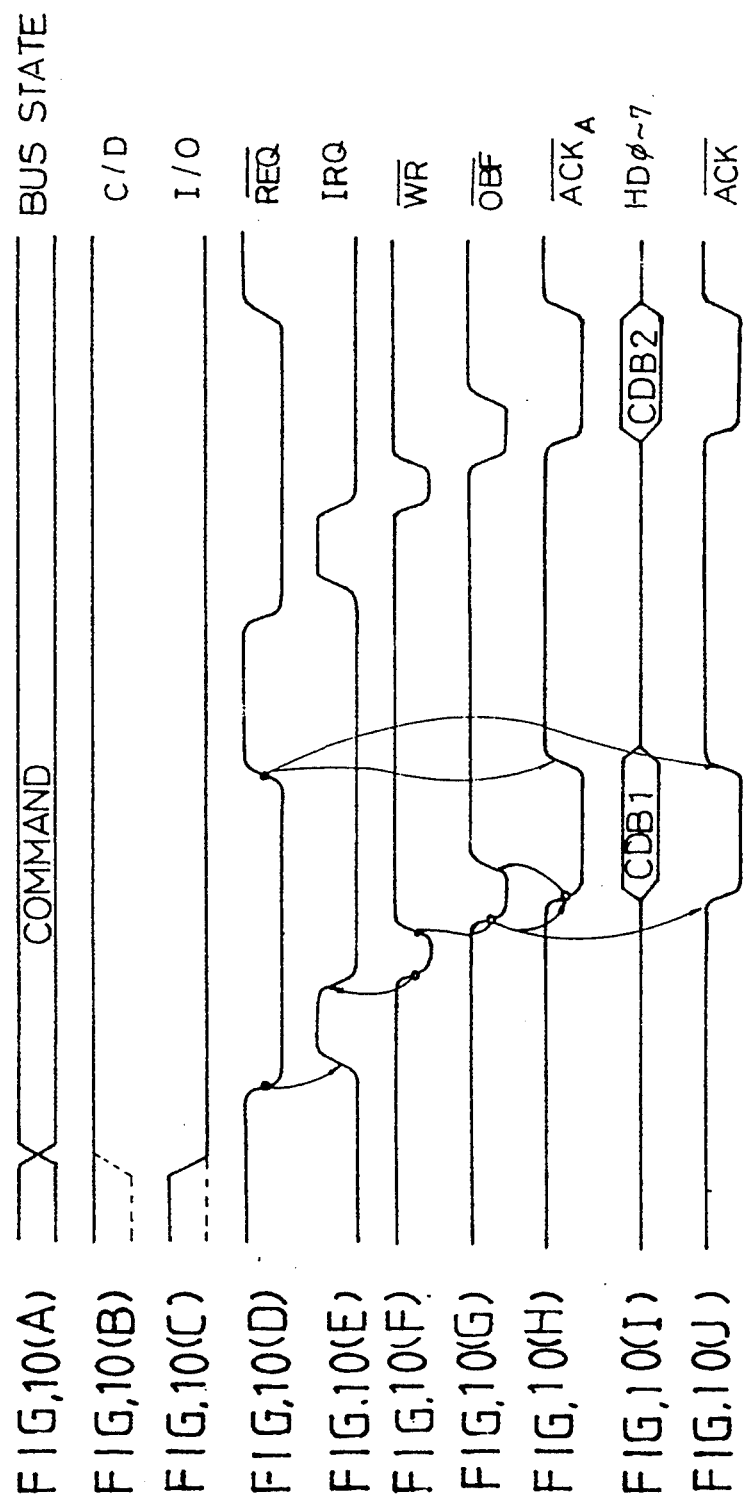

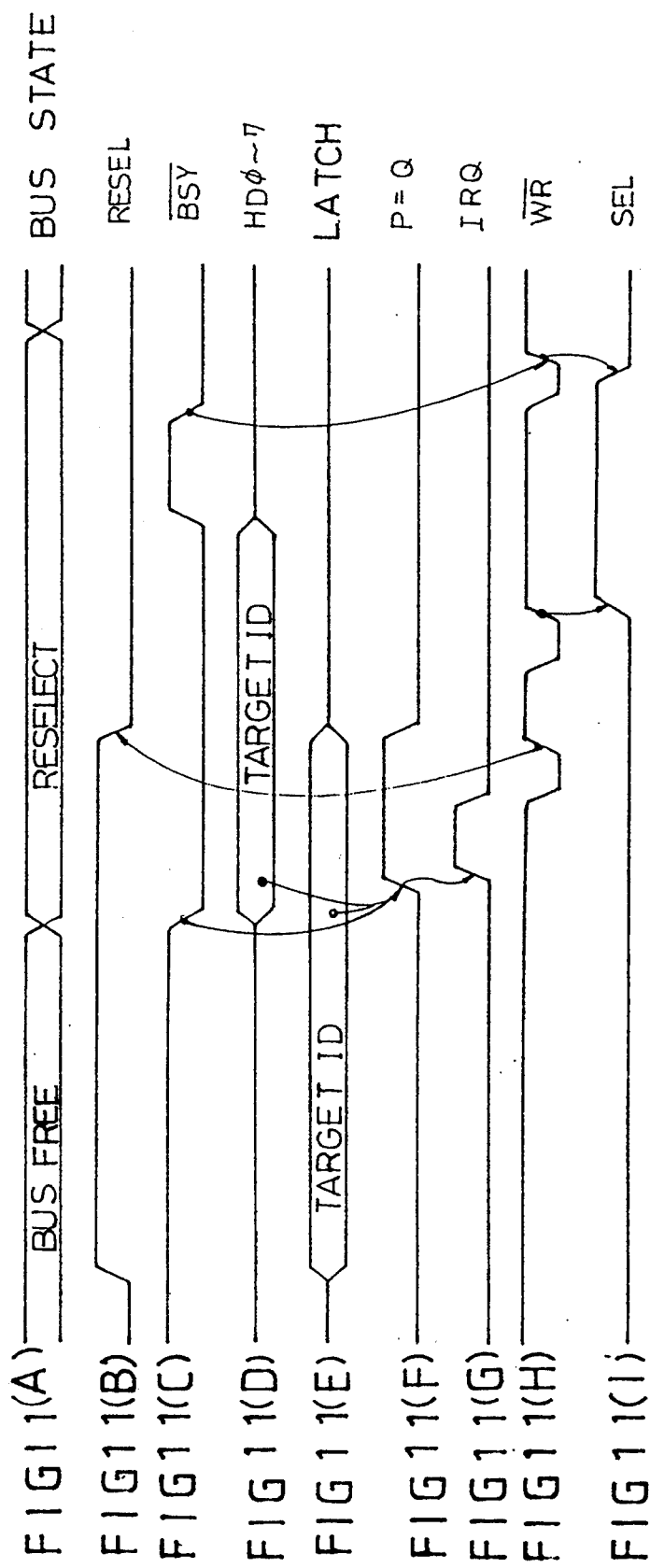

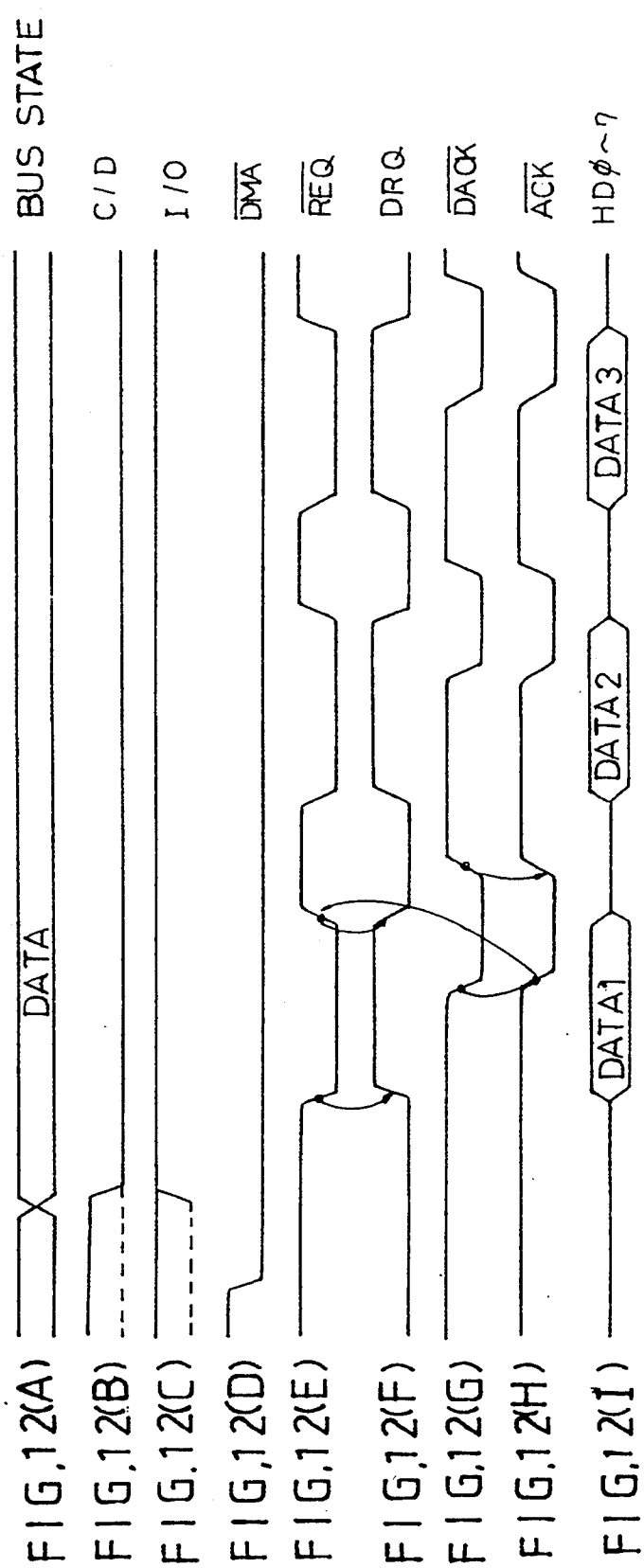

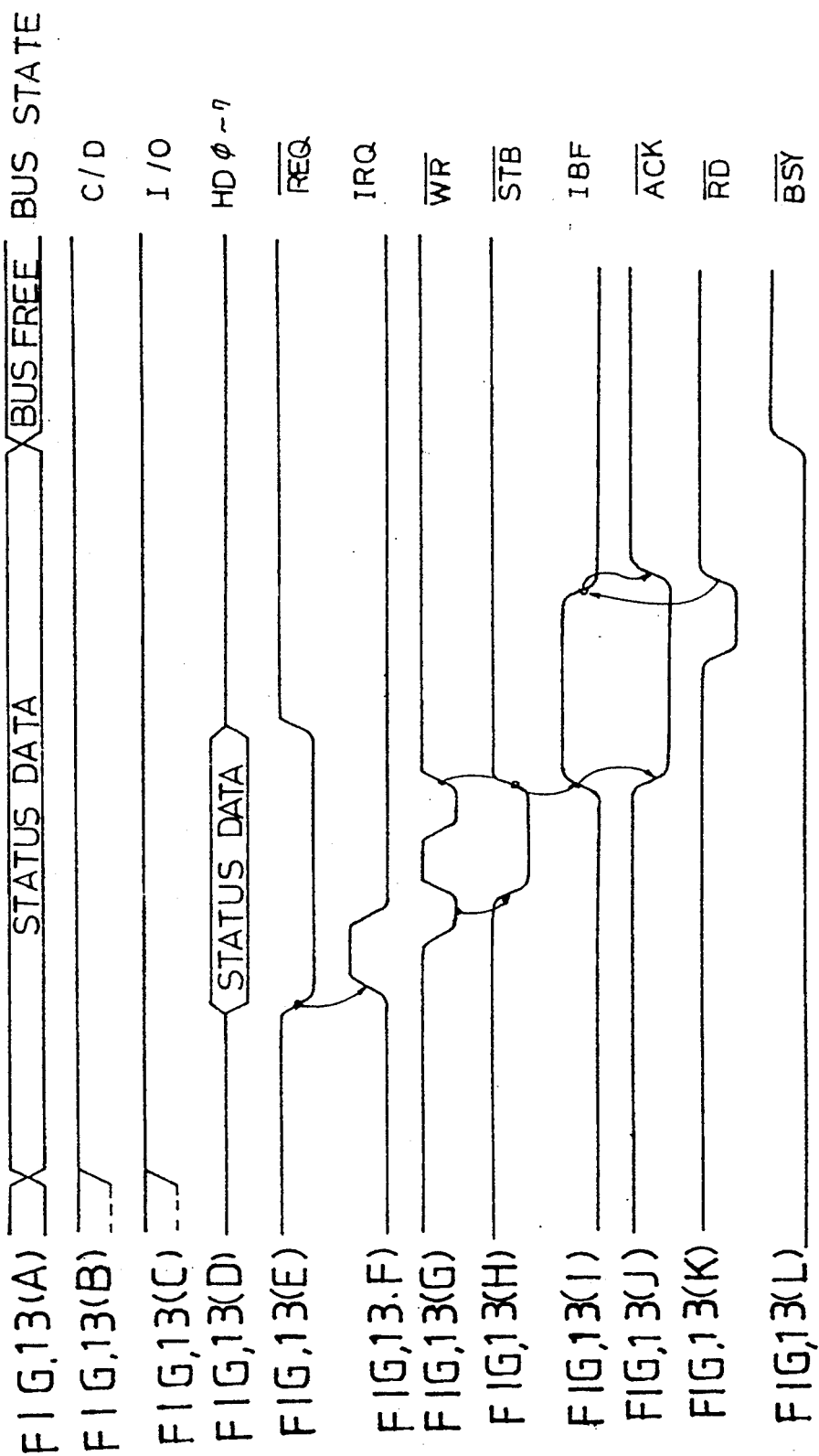

METHOD AND SYSTEM FOR INTERFACING PC TO CD-ROM DRIVES

BACKGROUND OF THE INVENTION

1. Field of the Invention

The present invention relates in general to interfacing of a personal computer, referred to hereinafter as PC, to the peripheral equipments, and more particularly to a method and a system for interfacing a PC to CD-ROM drives wherein the interfacing time of the PC can efficiently be managed suitably to a high speed operation of the system when the PC is connected to a plurality of CD-ROM drives.

2. Description of the Prior Art

Methods of interfacing a PC to CD-ROM drives may generally be classified into two types. The first method is a standard method for interfacing of a small computer system, which is broadly used in that it has the advantage of providing compatibility and a variety of functions for the computer system. The second method is that provides an interfacing method and a circuit thereof suitable to the internal structure and functions of a host computer. The second method has the advantage, in that the optimum computer architecture is enabled in consideration of the functions and performance of the PC used as the host computer and the cost thereof is low.

The interfacing of the PC to the CD-ROM drives based on the second method is illustrated in FIG. 1. As shown in this drawing, in the case where the PC as the host computer is connected to the CD-ROM drives via an interface bus, first at a bus free state (S1), the host PC selects one of the CD-ROM drives required to communicate therewith, as a target, at a step S2. Then at a step S3, the host PC generates a control command for instructing the DC-ROM drive selected as the target to transmit information data and target status data thereto. In response to the control command, the CD-ROM drive selected as the target prepares for the information data and the status data to be transmitted to the host PC. Upon completion of the preparation for the information data and the status data, the target CD-ROM drive transmits the information data and the status data to the host PC at steps S4 and S5. When the data transmission from the target to the host PC is completed, the bus through which the host PC is connected to the target is made the free state (S1) and the host PC proceeds to a different job.

However, the first method has a disadvantage, in that it has no regard for the internal functions and performance of the PC used as the host computer. Although the PC has been designed to utilize functions of various peripheral equipments, the interfacing is performed only based on the standard method, such that the PC does not utilize fully transmission speeds, respectively, suitable to the peripheral equipments and other functions. Since the PC does not utilize fully a multiplicity of functions thereof, it may become "over spec". Moreover, the cost of the interfacing hardware and software is high.

Also, the second method has a disadvantage, in that the interfacing hardware and software are provided suitably to a variety of types of the PC, resulting in provision of no compatibility with one another. Moreover, after the host PC selects the target CD-ROM drive and generates the command thereto, it waits for the target CD-ROM drive to transmit the information data and the status data thereto, without performing other jobs. Because the CD-ROM drive has the access time longer than those of other recording media such as a hard disk drive (HDD) (i.e., 500-900 msec. in the CD-ROM drive while several tens msec. in the HDD), it has the long preparation time for the data to be transmitted to the host PC. For this reason, the interfacing time becomes long. Furthermore, when the interfacing is carried out between the host PC and any one of the peripheral equipments, the communication of the host PC with the other peripheral equipments is made impossible. This results in an inefficiency of the interfacing.

SUMMARY OF THE INVENTION

Therefore, the present invention has been made in view of the above problems, and it is an object of the present invention to provide a method and a system for interfacing a PC to CD-ROM drives wherein the PC as a host can perform a different job while one of the CD-ROM drives selected as a target prepares for data to be transmitted to the host PC, thereby resulting in an increase in the interfacing efficiency.

It is another object of the present invention to provide a method and a system for interfacing a PC to CD-ROM drives wherein the CD-ROM drives as peripheral equipments can be granted identification data, respectively, and selected as a target according to the identification data, so that the PC as a host can be connected, at a time, to a plurality of CD-ROM drives as the peripheral equipments.

It is a further object of the present invention to provide a method and a system for interfacing a PC to CD-ROM drives wherein a hardware for executing the interfacing between the PC as a host and the CD-ROM drives as peripheral equipments can be constructed as a simple logic circuit and the interfacing can be controlled by the minimum number of signals.

In accordance with one aspect of the present invention, there is provided a method of interfacing a PC to CD-ROM drives, comprising: a target select step of allowing the PC as a host to select one of the CD-ROM drives as a target at a bus free state of no interfacing between the PC and the CD-ROM drives; a command generate step of generating from the host a command to be executed by the target; a bus free step of, if the generated command from the host contains a disconnect command, transmitting disconnect status data from the target to the host and then making an interface bus through which the host is connected to the target the free state so that the host can perform a different job while the target prepares for data to be transmitted based on the generated command from the host; a reselect step of informing the host that the target completes the preparation for the data to be transmitted so that the host reselects the same target; a data transmit step of, if the same target is reselected by the host at the reselect step or if there is no disconnect command at the command generate step, transmitting the data prepared based on the generated command from the host from the target to the host; and a status data transmit step of transmitting status data as a result of command execution from the target to the host.

In accordance with another aspect of the present invention, there is provided a system for interfacing a PC to CD-ROM drives, comprising: a programmable input/output extended device for bidirectionally transmitting data signals from the PC as a host and data signals from one of the CD-ROM drives as a target and controlling the interfacing between the host PC and the target in response to a plurality of interface control signals from said host PC and a plurality of response signals from said target; target data transmitting and receiving means for selecting a data transmitting direction on the basis of a logical sum of an input/output request signal from said target and a target select signal from said programmable input/output extended device and performing a bidirectional data transmission among the target, the host PC and the programmable input/output extended device according to the selected data transmitting direction; target identifying means for latching target identification data transmitted through said programmable input/output extended device from said host PC, comparing the latched target identification data with self-identification data from said target and generating a reselect control signal as a result of the comparison; a control signal drive buffer for driving a command data request signal, the input/output request signal, a busy signal and a request signal outputted from said target and the target select signal and an acknowledge signal to be received by said target; control signal transmitting means for transmitting the command data request signal the input/output request signal and the busy signal outputted through said control signal drive buffer from said target directly to said programmable input/output extended device, inverting the target select signal from said programmable input/output extended device, transmitting the inverted target select signal through said control signal drive buffer to said target and applying an acknowledge signal to said programmable input/output extended device and the acknowledge signal to said target in response to an input buffer full signal, an output buffer full signal and a strobe signal from said programmable input/output extended device and a data acknowledge signal from said host PC; interrupt request signal generating means for generating an interrupt request signal in response to the request signal from said target and a direct memory access signal from said programmable input/output extended device and controlling release of the interrupt request signal in response to a write signal, a chip select signal and a reset signal being applied to said programmable input/output extended device; interface selecting means for comparing an address of a dip switch which is preset by the user with an address for selection of input/output expansion slots in said host PC and outputting the chip select signal to said programmable input/output extended device if the addresses are the same as a result of the comparison; data reception control means for generating a data transmission request signal based on the direct memory access to said host PC in response to the direct memory access signal from said programmable input/output extended device and the request signal from said target and driving the data transmitted through said target data transmitting and receiving means from said target in response to the data acknowledge signal from said host PC and the direct memory access signal from said programmable input/output extended device to transmit the driven data to a direct memory access controller in said host PC; and a plurality of select switches for selecting direct memory access channels in said host PC corresponding to the data request signal and the data acknowledge signal to/from said host PC and a level in said host PC corresponding to the interrupt request signal to said host PC, respectively.

BRIEF DESCRIPTION OF THE DRAWINGS

The above and other objects, features and advantages of the present invention will be more clearly understood from the following detailed description taken in conjunction with the accompanying drawings, in which:

FIG. 6 is a table illustrating a bus state by steps in FIG. 5;

FIGS. 9A to 9G are timing diagrams of signals at a target select step in FIG. 5;

FIGS. 10A to 10J are timing diagrams of signals at a command generate step in FIG. 5;

FIGS. 11A to 11I are timing diagrams of signals at a reselect step in FIG. 5;

FIGS. 12A to 12I are timing diagrams of signals at a data transmit step in FIG. 5; and FIGS. 13A to 13L are timing diagrams of signals at a status data transmit step in FIG. 5.

DETAILED DESCRIPTION OF THE PREFERRED EMBODIMENTS

Figure 1:
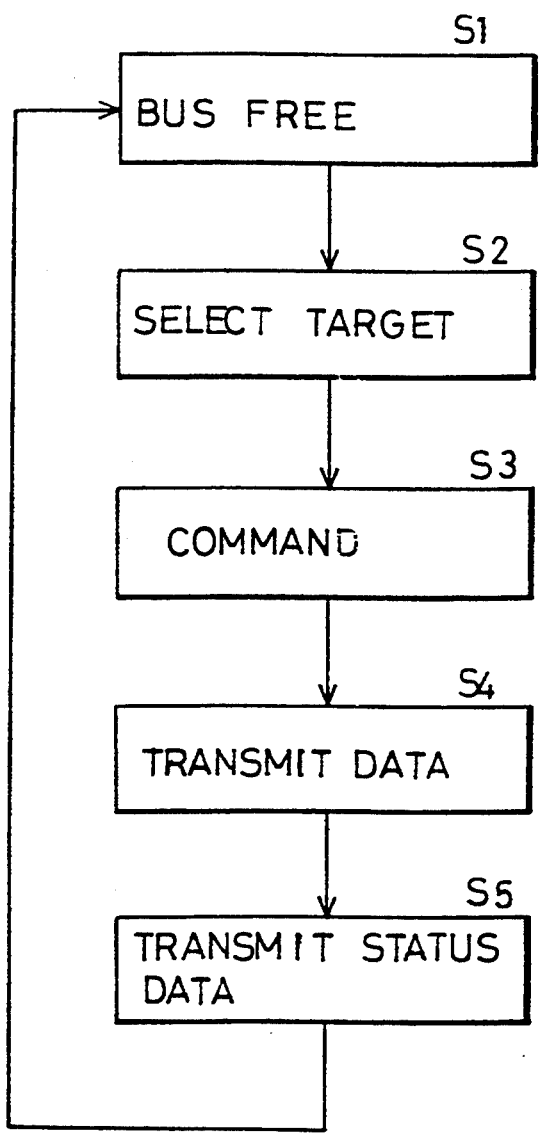
FIG. 1 is a flowchart illustrating a method of interfacing a PC to CD-ROM drives in accordance with the prior art.
Figure 2:
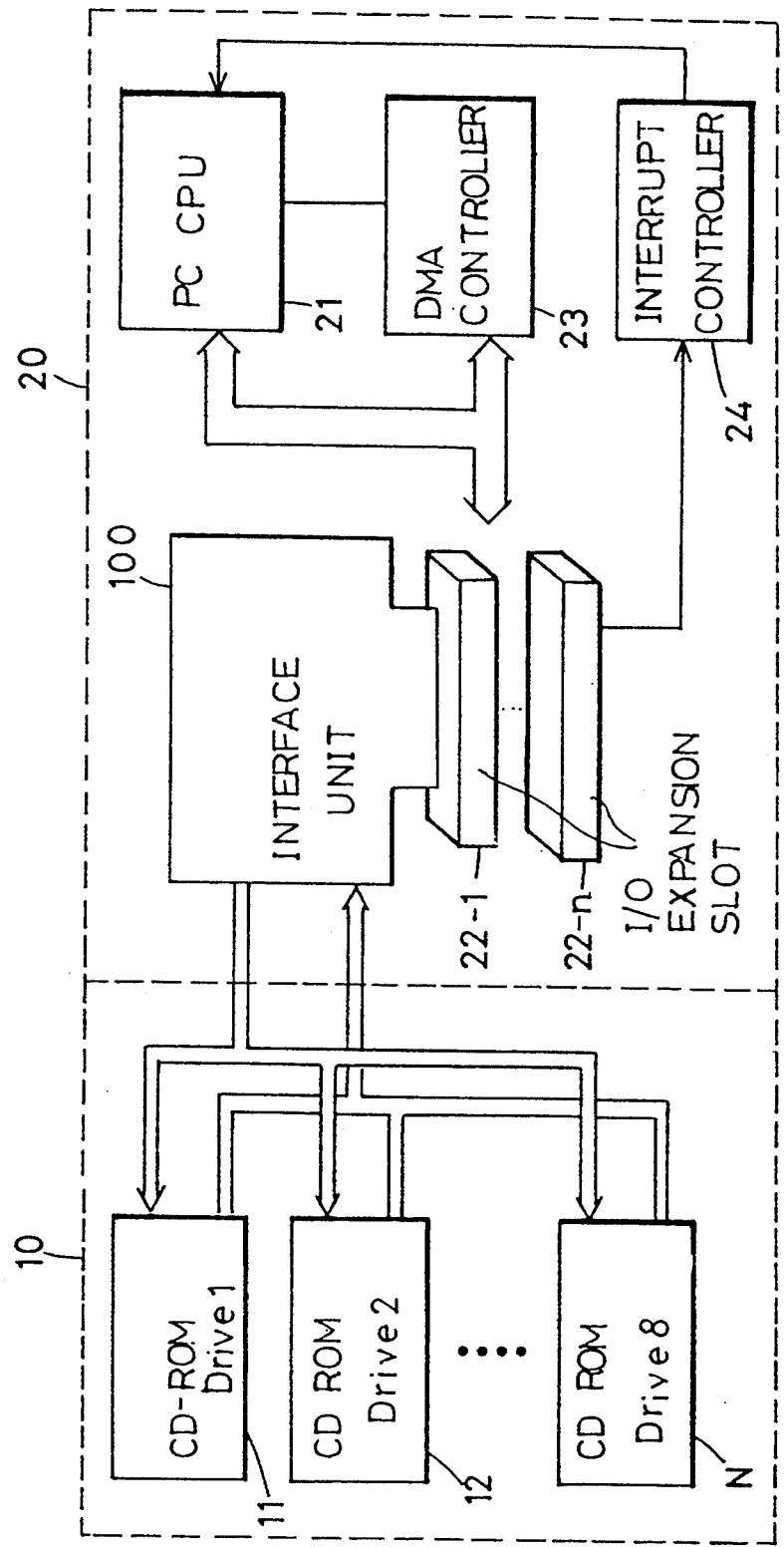
FIG. 2 is a block diagram of a system for interfacing a PC to CD-ROM drives in accordance with the present invention.

Referring to FIG. 2, there is shown a block diagram of a system for interfacing a PC to CD-ROM drives in accordance with the present invention. As shown in this figure, an interface circuit 100 of the present invention is mounted in any one of a plurality of input/output (I/O) expansion sloths 22-1 to 22-N in a host PC 20 and connected through a single interface bus to a target device 10 in which a plurality of CD-ROM drives 11 to N are connected in parallel with respect to one another. The interface circuit 100 executes the interfacing between the host PC 20 and the target device 10.

The host PC 20 comprises a PC central processing unit (CPU) 21, a direct memory access (DMA) controller 23, an Interrupt controller 24 and the plurality of input/output (I/O) expansion slots 22-1 to 22-N as mentioned above.

Figure 3:
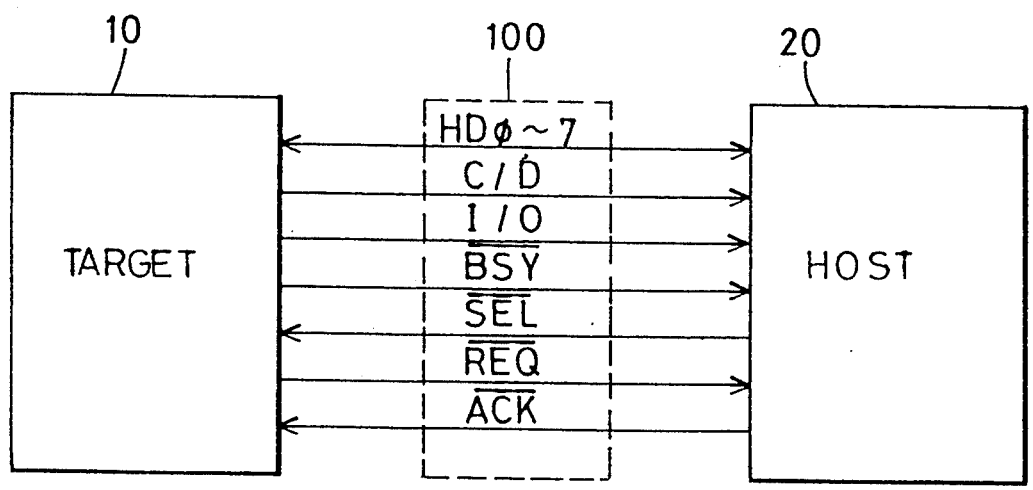
FIG. 3 is a view illustrating signals for interfacing between the PC and the CD-ROM drives in accordance with the present invention.

Referring to FIG. 3, there is illustrated signals for the interfacing between the host PC 20 and the target 10 in accordance with the present invention. As shown in this drawing, a plurality of data and control signals are interfaced between the target 10 and the host PC 20 through the interface circuit 100. Namely, the host PC 20 transmits target identification data ID, command data, a target select Signal/SEL and a data reception acknowledge signal/ACK to the target 10 through the interface circuit 100. The target 10 transmits a command data request signal C/D, an input/output request signal I/O, a request signal/REQ, a busy signal/BSY, status data and information data to the host PC 20 through the interface circuit 100.

Figure 4:
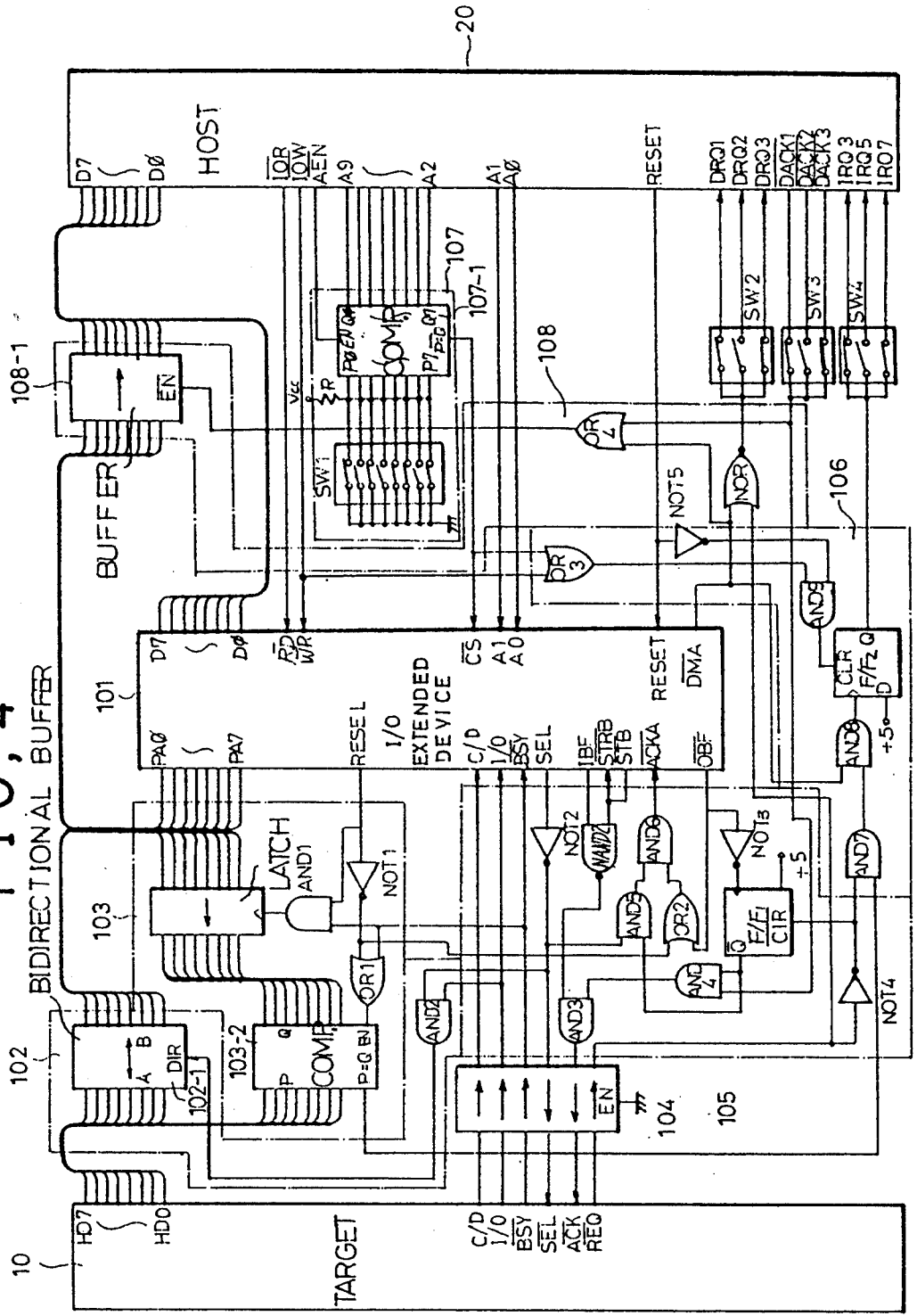
FIG. 4 is a detailed block diagram of an interface circuit in FIG. 2.

Referring to FIG. 4, there is shown a detailed block diagram of the interface circuit 100 in FIG. 2. As shown in this figure, the interface circuit 100 comprises a programmable input/output (I/O) extended device 101 for bidirectionally transmitting data signals D0–D7 from the host PC 20 and data signals PA0–PA7 from the target 10. The programmable input/output extended device 101 receives a read signal/RD, a write signal/WR, address signals A0 and A1, a reset signal RESET and a chip select signal/CS from the host PC 20 and receives the command data request signal C/D, the input/output request signal I/O and the busy signal/BSY from the target 10 and an acknowledge signal/ACK$_A$. In response to the received signals, the programmable input/output extended device 101 generates a reselect signal RESEL, the target select signal SEL, an input buffer full signal IBF, a strobe signal STB, an output buffer full signal/OBF and a direct memory access signal/DPIA to control the interfacing between the host PC 20 and the target 10.

The interface circuit 100 also comprises a target data transmitting and receiving circuit 102 for selecting a data transmitting direction on the basis of a logical sum of the input/output request signal I/O from the target 10 and the target select signal/SEL from the programmable input/output extended device 101 and performing a bidirectional data transmission among the target 10, the host PC and the programmable input/output extended device 101 according to the selected data transmitting direction, a target identifying circuit 103 for latching the target identification data transmitted through the programmable input/output extended device 101 from the host PC 20, comparing the latched target identification data with identification data from the target 10 and generating a reselect control signal as a result of the comparison, and a control signal drive buffer 104 for driving the command data request signal C/D, the input/output request signal I/O, the busy signal/BSY and the request signal/REQ outputted from the target 10 and the target select signal/SEL and the acknowledge signal/ACK to be received by the target 10.

The interface circuit 100 also comprises a control signal transmitting circuit 105 for transmitting the command data request signal C/D, the input/output request signal I/O and the busy signal /BST outputted through the control signal drive buffer 104 from the target 10 directly to the programmable input/output extended device 101, inverting the target select signal SEL from the programmable input/output extended device 101, transmitting the inverted target select signal/SEL through the control signal drive buffer 104 to the target 10 and applying the acknowledge signals/ACK and-/ACK, respectively, to the programmable input/output extended device 101 and the target 10 in response to the input buffer full signal IBF, the output buffer full signal-/OBF and the strobe signal/STB from the programmable input/output extended device 101 and a data acknowledge signal DACK from the host PC 20.

The interface circuit 100 also comprises an interrupt request signal generating circuit 106 for generating an interrupt request signal IRQ in response to the request signal REQ from the target 10 and the direct memory access signal DMA from the programmable input/output extended device 101 and controlling release of the interrupt request signal IRQ in response to the write signal/WR, the chip select signal/CS and the reset signal RESET being applied to the programmable input/output extended device 101, an interface selecting circuit 107 for comparing an address of a dip switch SW1 which is preset by the user with an address for select on of the input/output expansion slots 22-1 to 22-N in the lost PC 20 and outputting the chip select signal/CS to the programmable input/output extended device 101 if the addresses are the same as a result of the comparison, and a data reception control circuit 108 for generating a data transmission request signal DRQ based on the direct memory access to the host PC 20 in response to the direct memory access signal /DMA from the programmable input/output extended device 101 and the request signal /REQ from the target 10 and driving the data transmitted through the target data transmitting and receiving circuit 102 from the target 10 in response to the data acknowledge signal DACK from the host PC 20 and the direct memory access signal/DMA from the programmable input/output extended device 101 to transmit the driven data to the direct memory access control let 23 in the host; PC 20.

The interface circuit 100 also comprises a plurality of select switches SW2, SW3 and SW4 for selecting direct memory access channels in the host PC 20 corresponding to the data request signal DRQ and the data acknowledge signal /DACK to/from the host PC 20 and a level in the host PC 20 corresponding to the interrupt request signal IRQ to the host PC 20, respectively.

The target data transmitting and receiving circuit 102 includes a bidirectional buffer 102-1 having its one ports A connected to data ports HD0–HD7 of the target 10 and its other ports B connected to data ports PA0–PA7 of the programmable input/output extended device 101 and to a data bus of the data reception control circuit 108 and transmitting the data bidirectionally, and an AND gate AND2 for ANDing the target select signal/-SEL from the programmable input/output extended device 101 and the input/output request signal I/O from the target 10 and applying the ANDed signal as a direction select signal DIR to the bidirectional buffer 102-1.

The target identifying circuit 103 includes an AND gate AND1 for ANDing the reselect signal RESEL from the programmable input/Output extended device 101 and the busy signal/BSY from the target 10 and outputting the ANDed signal as a latch control signal, a NOT gate NOT1 for inverting the reselect signal RESEL from the programmable input/output extended device 101, an OR gate OR1 for ORing the inverted reselect signal/RESEL from the NOT gate NOT1 and the busy signal/BSY from the target 10 and outputting the ORed signal as a comparator enable signal, a latch 103-1 for latching the target identification data outputted through the data ports PA0–PA7 of the programmable input/output extended device 101 in response to the latch control signal from the AND gate AND1, and a comparator 103-2 for comparing the target identification data Q latched in the latch 103-1 with the identification data P outputted through the data ports HD0–HD7 of the target 10 in response to the enable signal from the OR gate OR1 and outputting the reselect control signal if the identification data are the same (P=Q) as a result of the comparison.

The control signal transmitting circuit 105 transmits the command data request signal C/D, the input/output request signal I/O and the busy signal /BST outputted through the control signal drive buffer 104 from the target 10 directly to the programmable input/output extended device 101. Also, the control signal transmitting circuit 105 includes a NOT gate NOT2 for inverting the target select signal SEL from the programmable input/output extended device 101 and transmitting the inverted target select signal /SEL through the control signal drive buffer 104 to the target 10, a NAND gate NAND2 for NANDing the input buffer-full signal IBF and the strobe signal/STB from the programmable input/output extended device 101, a NOT gate NOT3 for inverting the output buffer full signal/OBF from the programmable input/output extended device 101 and outputting the inverted signal as a flip-flop clock signal, a NOT gate NOT4 for inverting the request signal/REQ outputted through the control signal drive buffer 104 from the target 10 and outputting the inverted signal as a flip-flop clear signal/CLR, a flip-flop F/F1 for outputting a control signal in response to the clear signal/CLR from the NOT gate NOT4 and the clock signal from the NOT gate NOT3, an AND gate AND4 for ANDing an inverting output signal/Q of the flip-flop F/F1 and the data acknowledge signal/DACK from the host PC 20, an AND gate AND3 for ANDing an output signal from the AND gate AND4 and an output signal from the NAND gate NAND2 and applying the ANDed signal as the acknowledge signal/ACK to the target 10 through the control signal drive buffer 104, an OR gate OR2 for ORing the output buffer full signal/OBF from the programmable input/output extended device 101 and the inverted reselect signal/RESEL from the NOT gate NOT1 in the target identifying circuit 103, an AND gate AND5 for ANDing the inverting output signal/Q of the flip-flop F/F1 and the inverted target select signal/SEL from the NOT gate NOT2, and an AND gate AND6 for ANDing an output signal from the AND gate AND5 and an output signal from the OR gate OR2 and applying the ANDed signal as the acknowledge signal /ACK$_A$ to the programmable input/output extended device 101.

The interrupt request signal generating circuit 106 includes an AND gate AND7 for ANDing the reselect control signal (P=Q) from the target identifying circuit 103 and the inverted one REQ of the request signal/REQ outputted through the control signal drive buffer 104 from the target 10, an AND gate AND8 for ANDing an output signal from the AND gate AND7 and the direct memory access signal/DMA from the programmable input/output extended device 101 and outputting the ANDed signal as a flip-flop clock signal, a flip-flop F/F2 for outputting the interrupt request signal IRQ in response to the clock signal from the AND gate AND8, an OR gate OR3 for ORing the write signal/WR being applied from the host PC 20 to the programmable input/output extended device 101 and the chip select signal /CS being applied from an address comparator 107-1 in the interface selecting circuit 107 to the programmable input/output extended device 101, a NOT gate NOT5 for inverting the reset signal RESET being applied from the host PC 20 to the programmable input/output extended device 101, and an AND gate AND9 for ANDing an output signal from the NOT gate NOT5 and an output signal from the OR gate OR3 and applying the ANDed signal as a clear signal/CLR to the flip-flop F/F2.

The data reception control circuit 108 includes a NOR gate NOR1 for NORing the request signal/REQ from the target 10 and the direct memory access signal /DMA from the programmable input/output extended device 101 and outputting the NORed signal as the data request signal DRQ to the host PC 20, an OR gate OR4 for ORing the direct memory access signal DMA from the programmable input/output extended device 101 and the data acknowledge signal/DACK from the host PC 20 and outputting the ORed signal as a buffer enable signal, and a data drive buffer 108-1 responsive to the enable signal from the OR gate OR4 for driving the data transmitted through the bidirectional buffer 102-1 in the target data transmitting and receiving circuit 102 from the target 10 and transmitting the driven data to the direct memory access controller 23 in the host PC 20.

The select Switches SW2 and SW3 are adapted to select the direct memory access channels in the host PC 20. Typically in the PC, there are 4 direct memory access channels, the first channel for refresh, the third channel for floppy disk player and the second and fourth channels for spare. One of the second and fourth channels may be selected for the interfacing of the PC to the CD-ROM drives.

Figure 5:
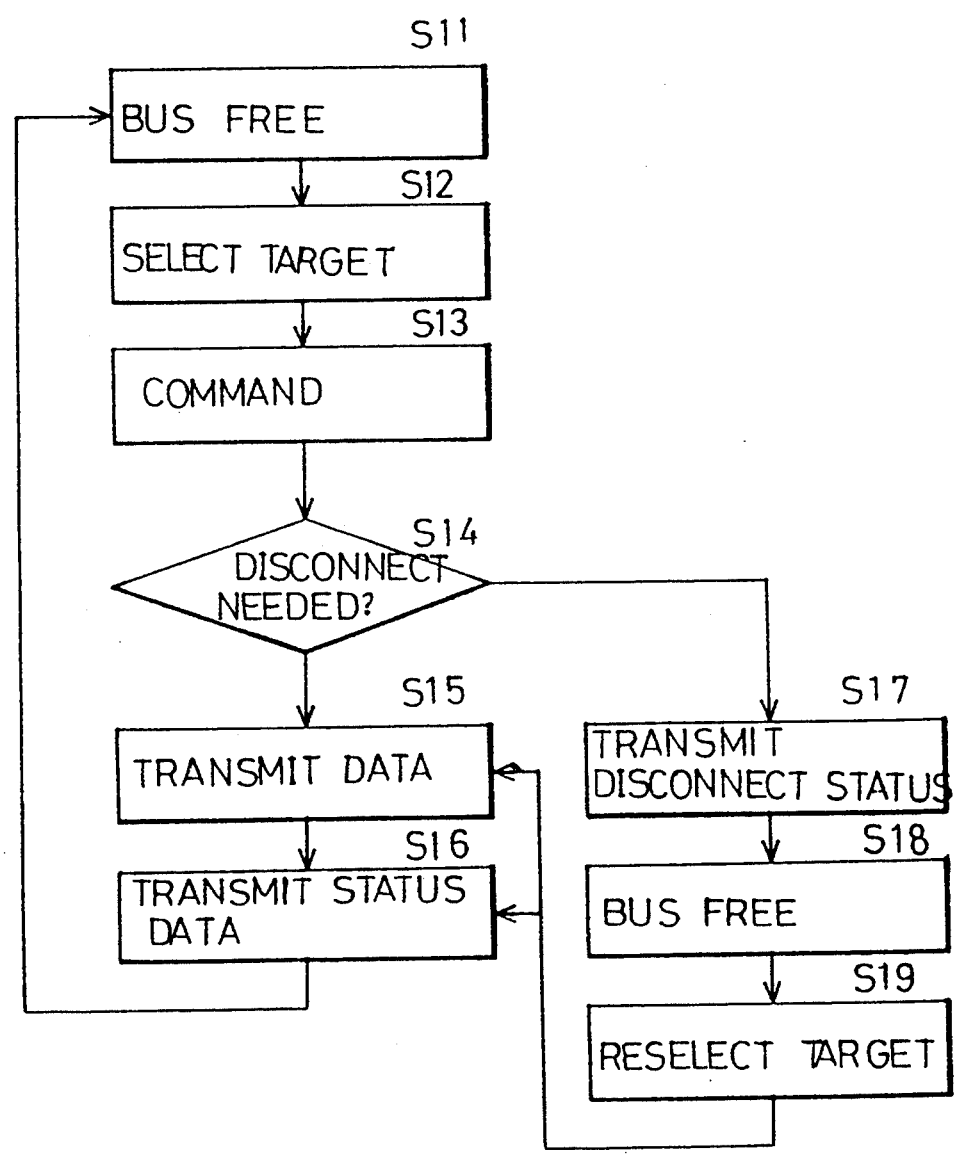
FIG. 5 is a flowchart illustrating a method of interfacing a PC to CD-ROM drives in accordance with the present invention.

Referring to FIG. 5, there is shown a flowchart illustrating a method of interfacing the PC to the CD-ROM drives in accordance with the present invention. As shown in this drawing, the method of the present invention comprises a target select step S12 of allowing the PC as a host to select one of the CD-ROM drives as a target at a bus free state S11 of no interfacing between the PC and the CD-ROM drives, a command generate step S13 of generating from the host a command to be executed by the target, a bus free step S18 of, if the generated command from the host contains a disconnect command, transmitting disconnect status data from the target to the host and then making an interface bus through which the host is connected to the target the free state so that the host can perform a different job while the target prepares for data to be transmitted based on the generated command from the host, a reselect step S19 of informing the host that the target completes the preparation for the data to be transmitted so that the host reselects the same target, a data transmit step S15 of, if the same target is reselected by the host at the reselect step S19 or if there is no disconnect command at the command generate step S13, transmitting the data prepared based on the generated command from the host from the target to the host, and a status data transmit step S16 of transmitting status data as a result of command execution from the target to the host.

Now, the operation of the construction as mentioned above in accordance with the present invention will be described in detail.

In operation, as shown in FIG. 5, there is first required the target select step S12 in which the host PC 20 selects one of the CD-ROM drives 11 to N in the target 10 at the bus free state S11 of no interfacing. If the target 10 is selected, there is performed the command generate step S13 in which the host PC 20 generates a command set (command description block) for giving the target 10 a task.

Figure 7:
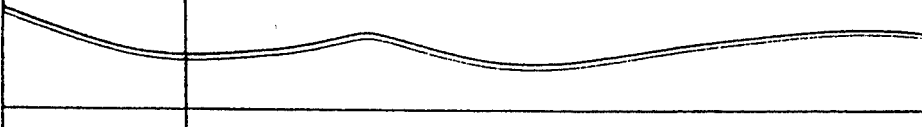
FIG. 7 is a format of command data in accordance with the present invention.

At the command generate step S13, the host PC transmits the command data in the form of a format as shown in FIG. 7 to the target 10. In the command data format, the first bit (0) of the second byte is designated by "DC" which represents "disconnect" inhibit if "0" and "disconnect permit" if "1". With the command data containing the DC bit, the host PC 20 informs the target 10 whether disconnect or not at a step S14.

Upon receiving the command data from the host PC 20, the target 10 determines the disconnect permit if the DC bit has been set in the command data ("DC" = "1") and transmits status data for the disconnect to the host PC 20 at a step 17.

After transmission of the disconnect status data from the target 10 to the host PC 20 in this manner, the busy signal /BSY is made inactive in the target 10, thereby allowing the interface bus to be made the free state at the step S18. This enables the host PC 20 to perform a different job while the target 10 prepares for data to be transmitted based on the generated command from the host PC 20. Namely, if the bus free step S18 is made, the CD-ROM drive as the target prepares for the data to be transmitted based on the generated command from the host PC 20 by reading the corresponding data on a disk. The data preparation time is several hundred msec to several seconds required in pick-up moving (access or scan), data reading, error processing and etc.

When the target 10 completes the preparation for data transmission, it transmits the reselect requesting interrupt signal to the host PC 20 to inform the host PC 20 that the preparation for data transmission has been completed. In response to the reselect requesting interrupt signal from the target 10, the host PC 20 reselects the same target 10 at the step S19.

If the target 10 is reselected by the host PC in this manner, it performs the data transmit step S15 of transmitting the data prepared based on the generated command to the host PC 20 and the status data transmit step S16 of transmitting the status data as a result of the command execution to the host PC 20.

On the other hand, if the "DC" bit has been reset ("DC" = "0") at the command generate step S13, the target 10 performs the operation based on the generated command from the host PC 20 with no disconnect operation. Namely, the command execution of the target 10 continues via no bus free step under the condition that the target 10 is connected to the host PC 20 through the interface bus. Then, when the target 10 completes the command execution and thus the preparation for transmission data, it performs the data transmit step S15 of transmitting the data prepared based on the generated command to the host PC 20 and the status data transmit step S16 of transmitting the status data as a result of the command execution to the host PC 20.

In other words, when the target 10 prepares the transmission data and then transmits the reselect signal to the host PC 20 in the case of requiring no disconnect or after the bus free step S18 resulting from the disconnect step, the host PC 20 stores in its memory the data transmitted from the target at the data transmit step S15. After completion of the data transmission, the host PC 20 receives the status data, in the form of a format as shown in FIG. 8, as a result of the command execution from the target 10 at the status data transmit step S16 and then makes the interface bus the free state (S11).

Figure 8:
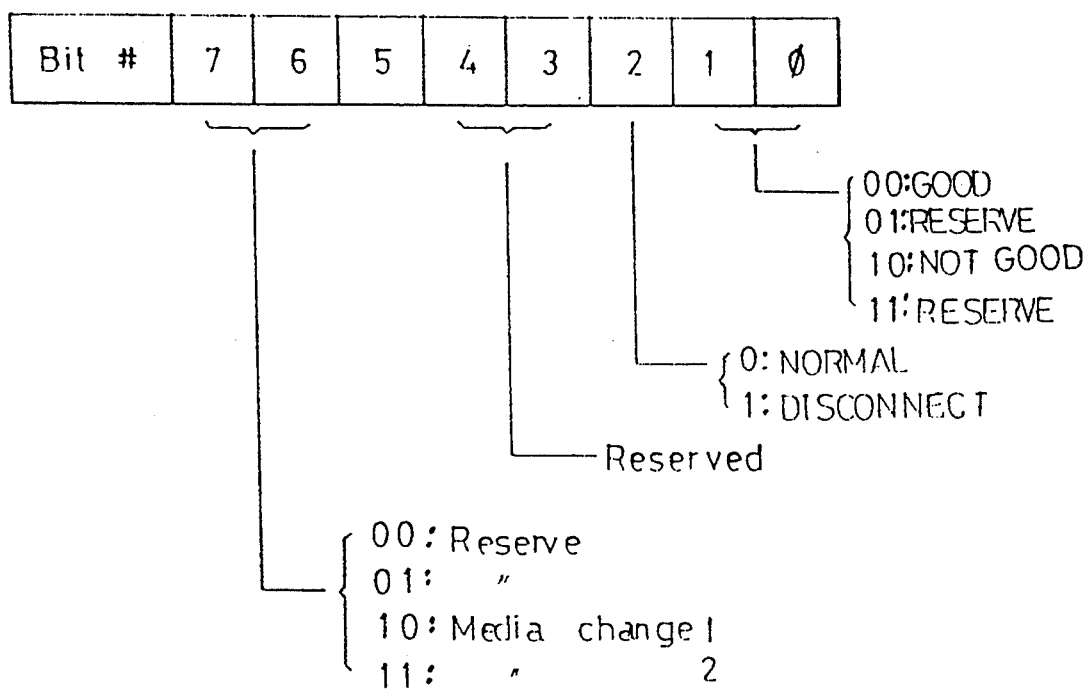
FIG. 8 is a format of status data in accordance with the present invention.

As shown in FIG. 8, the status data is 8 bits data, the first and second bits (0 and 1) 00: good, 01: reserve, 10: not good and 11: reserve, the third bit (2) 0: normal and 1: disconnect, the fourth to sixth bits (3-5): reserve, and the seventh and eighth bits (6 and 7) 00 and 01: reserve and 10 and 11: media change 1 and 2, respectively.

As mentioned above, in accordance with the present invention, the interface bus is made the free state while the CD-ROM drive selected as the target prepares the data to be transmitted, based on the selection of the disconnect, so that the PC as the host can perform a different job, and the CD-ROM drive selected as the target can transmit the prepared data and the status data to the host through the reselect operation of reselecting the host upon preparation for the data to be transmitted.

First, the user operates the dip switch SW1 in the interface circuit 100 so that he or she presets an address corresponding to one of the input/output expansion slots in which the interface circuit 100 is mounted. Also, the user selects the direct memory access channels and interrupt level in the PC through the switches SW2-SW4, respectively.

Under these conditions, the host PC 20 outputs an address A9-A2 for selecting the input/output expansion slots 22-1 to 22-N to perform the interfacing with the CD-ROM drives. The comparator 107-1 compares the address outputted from the host PC 20 with the address preset in the dip switch SW1. If the addresses are the same as a result of the comparison, the comparator 107-1 outputs the chip select signal/CS of active "low" state to the programmable input/output extended device 101. As a result, the host PC 20 can execute the interfacing with the CD-ROM drives through the interfacing circuit 100.

Then, the host PC 20 performs the target select step S12 of selecting one of the CD-ROM drives required to communicate therewith. The target select step S12 is performed only at the bus free state as shown in FIGS. 9A to 9G.

At the target select step S12, the host PC 20 loads the target identification data D0-D7 into the programmable input/output extended device 101 at that time that it applies the write signal/WR of active "low" state as shown in FIG. 9C to the programmable input/output extended device 101. In the programmable input/output extended device 101, the loaded data is outputted through the output ports PA0-PA7 and the output buffer full signal/OBF becomes active "low" as shown in FIG. 9D.

If the host PC 20 makes the write signal/WR active "low" a second time as shown in FIG. 9C, the target select signal SEL is made active "high" in the programmable input/output extended device 101. The target select signal SEL of high state is inverted into a low signal by the NOT gate NOT2 and applied through the AND gate AND2 as the direction select signal DIM to the bidirectional buffer 102-1. In response to the applied direction select signal DIM, the bidirectional buffer 102-1 transmits the target identification data outputted through the programmable input/output extended device 101 to the target 10.

The target select signal SEL outputted from the programmable input/output extended device 101 is also applied as the select signal /SEL to the target 10 through the NOT gate NOT2 and the control signal drive buffer 104.

Also, the low-inverted target select signal/SEL through the NOT gate NOT2 is fed back as the acknowledge signal/ACK$_A$ to the programmable input/output extended device 101 through the AND gates AND5 and AND6. With the acknowledge signal ACK$_A$ applied, the programmable input/output extended device 101 acknowledges that the target has been selected. At this time, in the programmable input/output extended device 101, the output buffer full signal/OBF is made inactive "high". As a result, selected as the target is one of the CD-ROM drives in the target 10 having the same identification data as that transmitted through the bidirectional buffer 102-1.

The target 10 responses by making the busy signal /BSY active "low" as shown in FIG. 9B when its identification data is the same as the transmitted identification data and the select signal/SEL is active "low".

If the busy signal /BSY becomes active "low" within a predetermined period of time while it is continuously monitored by the host PC 20, the host PC 20 acknowledges that the target selection has been completed and applies the write signal /WR again to the programmable input/output extended device 101 to make the select signal SEL inactive "low".

The select signal SEL of inactive "low" is applied as the acknowledge signal /ACK$_A$ of high state to the programmable input/output extended device 101 through the NOT gate NOT2 and the AND gates AND5 and AND6. With the acknowledge signal ACK$_A$ of high state applied, the programmable input/output extended device 101 stops the output of the target identification data PA0–PA7 therefrom. The states of other signals at the target select step S12 are as follows:

C/D=I/O=/REQ=/STB=/DMA=/ACK=-
/DACK="H" IBF=RESEL="L"

If the target select step S12 is completed, the command generate step S13 is performed at a timing as shown in FIGS. 10A to 10J. In the command generate step S13, the host PC 20 transmits a command set (command description block in FIG. 7) to the selected target 10. The command set is comprised of the typical number of bytes and contains information regarding a task to be executed by the target 10.

If the target select step 812 is completed, the target 10 outputs the command data request signal C/D of "high" state and the input/output request signal I/O of "low" state, respectively, as shown in FIGS. 10B and 10C and the request signal /REQ of active "low" state as shown in FIG. 10D. The request signal /REQ is applied as the clock signal to the flip-flop F/F2 through the NOT gate NOT4 and the AND gates AND7 and AND8. In response to the applied clock signal, the flip-flop F/F2 generates the interrupt request signal IRQ of active "high" state.

With the interrupt request signal IRQ generated, the host PC 20 writes 1 byte CDB1 of the command set into the programmable input/output extended device 101. In response to the written 1 byte CDB1 of the command set, the output buffer full signal /OBF becomes "low" in the programmable input/output extended device 101. The low output buffer full signal/OBF is inverted into a high signal by the NOT gate NOT3 and applied as the clock signal to the flip-flop F/F1. In response to the applied clock signal, the flip-flop F/F1 makes its inverting output signal/Q "low". The low inverting output signal /Q from the flip-flop F/F1 is applied as the acknowledge signal/ACK to the target 10 through the AND gates AND4 and AND3 and as the acknowledge signal /ACK$_A$ to the programmable input/output extended device 101 through the AND gates AND5 and AND6.

If the acknowledge signal/ACK$_A$ is made active "low", the programmable input/output extended device 101 outputs the command set CBD1. At this time, the AND, gate AND2 outputs a low signal resulting from the low input/output request signal I/O from the target 10. In response to the low signal from the AND gate AND2, the bidirectional buffer 102-1 transmits the command set CDB1 transmitted through the programmable input/output extended device 101 to the target 10.

The target 10 reads the transmitted command set CDB1 and then makes the request signal/REQ inactive ("H") to clear the flip-flop F/F1. As a result, the acknowledge signals/ACK and ACK$_A$ become inactive ("H"). At this time, the host PC 20 makes the write signal/WR active "low" following the active state of the interrupt request signal IRQ, to clear the flip-flop F/F2 through the OR gate OR3 and the AND gate AND9, thereby resulting the release of the interrupt request signal IRQ.

If there is a further command set CDB to be received, the target 10 performs repeatedly the above procedure to continue to receive the command set CDB by making the request signal /REQ active. The states of other signals at the command generate step S13 are as follows:

DRQ=RESEL=SEL=IBF=RESET=/-
BSY="L"       /DACK=/DMA=/D-
MA=/STB="H"

On the other hand, the target 10 determines the disconnect permit if the disconnect bit DC has been set in the command data set received at the command generate step S13 ("DC"="1") and then transmits the disconnect status data to the host PC 20. The target 10 also makes the interface bus the free state (818), so that the host PC 20 can perform a different job while the CD-ROM drive selected as the target prepares the data to be transmitted.

That is, if the disconnect permit is determined ("DC"="1"), the target 10 performs the reselect step S19 of preparing for the data to be transmitted based on the command data and selecting the host upon completion of the preparation for the data to be transmitted. The reselect step S19 is performed at a timing as shown in FIGS. 11A to 11I. The host PC 20 writes the identification data ID of the target, to be permitted of reselection, into the output ports PA0–PA7 of the programmable input/output extended device 101, for preparation for the reselection at the bus free state. As a result, the programmable input/output extended device 101 outputs the reselect signal RESEL of active ("H") state. The outputted 15 reselect signal RESEL is applied as the latch control signal to the latch 103-1. In response to the applied latch control signal, the latch 103-1 latches the target identification data therein. At this time, the host PC 20 performs a different job until the interrupt request signal IRQ is applied thereto.

Thereafter, the target 10 performs a task (for example, reading the data on the disk) given at the command generate step S13 to prepare for the data to be transmitted, Upon completion of the data preparation, the target 10 sends the self-identification data ID over the data bus HD0–HD7 and makes the busy signal/BSY active ("L"), for the purpose of the reselection. It is noted herein that the CD-ROM drive as the target makes the busy signal/BSY active only at the bus free state.

The identification data comparator 103-2 is enabled by the OR gate OR1 and then compares the target identification data from the host PC 20 latched in the latch 103-1 with the self-identification data over the data bus HD0–HD7 from the target 10. If the identification data are the same (P=Q) as a result of the comparison, the comparator 103-2 outputs a high signal which is then applied as the clock signal to the flip-flop F/F2 through the AND gates AND7 and AND8. In response to the applied high signal, the flip-flop F/F2 outputs a high signal which is then applied as the interrupt request signal IRQ of high state to the host PC 20.

Accordingly, the host PC 20 is interrupted and acknowledges that the target 10 makes a demand for the reselection. As a result, the host PC 20 applies the write signal /WR to the programmable input/output extended device 101. In response to the applied write signal /WR, the programmable input/output extended device 101 outputs the reselect signal RESEL of low state and the target select signal SEL of active ("H") state, for permissively responding to the reselection of the target 10.

If the target select signal /SEL is made active ("L"), the target 10 withdraws the target identification data over the data bus HD0-HD7 and releases the busy signal /BSY temporarily and makes it active ("L") again. When the busy signal/BSY is made active again, the host PC 20 applies the write signal /WR again to the programmable input/output extended device 101 to make the target select signal SEL inactive ("L"). As a result, the reselect step S19 is completed. The states of other signals at the reselect step S19 are as follows:

C/D=I/O=/ACK=/REQ=/STB=/ACK$_A$=/-DACK=/DMA="H"

IBF=RESET=DRQ="L"

If the reselect step S19 is completed, the target 10 performs the data transmit step S15 of transmitting the data to the host PC 20. The data from the data port HD0-HD7 of the target 10 is transmitted through the bidirectional buffer 102-1 and the data drive buffer 108-1 to the data port, D0-D7 of the host PC 20.

The data transmit step S15 is performed at a timing as shown in FIGS. 12A to 12I. In order to transfer the data to the direct memory access controller 23, the host PC 20 makes the direct memory access signal/DHA active ("L") through the programmable input/output extended device 101 and then waits for the request signal/REQ from the target 10.

The target 10 makes the command data request signal C/D low and the input/output request signal I/O high, respectively, to execute the data transmit step S15. After sending 1 byte of data over the data bus HD0-HD7, the target 10 makes the request signal /REQ active "low". With the request signal/REQ made active "low", the data request signal DRQ becomes active "high" in the data reception control circuit 108. If the data request signal DRQ becomes active ("H"), the direct memory access controller 23 in the host PC 20 makes the data acknowledge signal /DACK active, thereby making the data drive buffer 108-1 enable through the OR gate OR4. Accordingly, the direct memory access controller 23 in the host PC 20 can read the data transmitted over the data bus from the target 10. Also with the data acknowledge signal DACK made active ("L"), the acknowledge signal/ACK to the target 10 is made active by the AND gates AND4 and AND3, thereby allowing the target 10 to release the request signal REQ (i.e. /REQ="H") and stop the output of the data over the data bus HD0-HD7.

If the data request signal DRQ is made inactive by the NOR gate NOR1 which inputs the inactive request signal /REQ from the target 10 and the direct memory access signal /DMA, the host PC 20 makes the data acknowledge signal /DACK inactive and performs the above data transmit step repeatedly. The states of other signals at the data transmit step are as follows:

/BSY=RESEL=IBF=RESET=IRQ="L"
/SEL=/STB=/OBF="H"

If the data transmit step S15 is completed, the operation enters the status data transmit step S16 of transmitting the status data as a result of the command execution from the target 10. The status data from the data bus HD0-HD7 of the target 10 is transmitted through the bidirectional buffer 102-1 and the data bus PA0-PA7 of the programmable input/output extended device 101 to the data bus D0-D7 of the host PC 20.

The status data transmit step S16 is performed at a timing as shown in FIGS. 13A to 13L. The target 10 makes both the command data request signal C/D and the input/output request signal I/O high to execute the status data transmit step S16. The target 10 makes the request signal/REQ active at that time of transmitting the status data, to generate the interrupt request signal IRQ of active state through the interrupt request signal generating circuit 106.

If the interrupt request signal IRQ becomes active, the host PC 20 controls the write signal /WR as shown in FIG. 13G so that the programmable input/output extended device 101 inputs and latches the status data from the target 10 and the strobe signal STB is at its active state for a predetermined period of time as shown in FIG. 13H. As a result, the input buffer full signal IBF is made active and the acknowledge signal/ACK to the target is made active.

As the acknowledge signal/ACK becomes active, the target 10 stops the output of the status data and makes the busy signal/BSY inactive. The central processing unit 21 in the host PC 20 reads the status data from the target 10 latched in the programmable input/output extended device 101. Accordingly, in the programmable input/output extended device 101, the input buffer full signal IBF becomes "low" resulting in the high state of the acknowledge signal/ACK. When the acknowledge signal/ACK becomes inactive "high", the target 10 makes the busy signal/BSY inactive to proceed to the bus free step S11. The states of other signals at the status data transmit step S16 are as follows:

RESEL=DRQ=RESET="L"
/ACK$_k$=/OBF=/DMA="H"

As hereinbefore described, according to the present invention, the disconnect function may be provided at the command generate step so that the host can perform a different job while the target prepares for the data to be transmitted, and it can receive the data prepared in the, target through the reselect step. Therefore, the interfacing time can be reduced and the availability of the host PC can be increased. Also, the use of the identification data makes it possible to connect the eight CD-ROM drives at a time and utilize them in a time-sharing manner. Further, the dip switch allows the user to select the direct memory access channels, the interrupt level and the input/output addresses in the PC.

Although the preferred embodiment of the present invention have been disclosed for illustrative purpose, those skilled in the art will appreciate that various modifications, additions and substitutions are possible, without departing from the scope and spirit of the invention as disclosed in the accompanying claims.

What is claimed is:

1. A system for interfacing a host PC (personal computer) which acts as a host, and includes at least one direct memory access controller, at least one direct memory access channel, at least one interrupt level and at least one input/output expansion slot, to at least one target CD-ROM (compact disc read-only memory) drive which acts as a target and includes a target data port and a target self-identification data, for the communication of data between said host PC and said target CD-ROM drive, the system comprising:

a programmable input/output extended device means operably connectable between the at least one input/output expansion slot of the host PC and the at least one target CD-ROM drive, and having a first data port for operable connection with the at least one input/output expansion slot of said host PC and also having a second data port, for bidirectionally transmitting data signals from the host PC to the target CD-ROM drive and data signals from the target CD-ROM drive and for controlling the interfacing between the host PC and the target CD-ROM drive in response to a plurality of interface control signals from said host PC and a plurality of response signals from said target CD-ROM drive, for outputting a target select signal, a reselect signal and a strobe signal in accordance with a write signal from the host PC, and for outputting an input buffer full signal and an output buffer full signal in accordance with the inputting of data thereto and the outputting of data therefrom;

target data transmitting and receiving means in operable communication with the second data port of said programmable input/output extended device means and operably connected with the target data port of said target CD-ROM drive for selecting a data transmitting direction between the host PC and the target CD-ROM drive on the basis of a logical sum of an input/output request signal from said target CD-ROM drive and a complement of the target select signal from said programmable input/output extended device means and for performing a bidirectional data transmission among the target CD-ROM drive, the host PC and the programmable input/output extended device means according to the selected data transmitting direction;

target identifying means in operable communication with the second data port of said programmable input/output extended device means and operably connectable with the target data port of the target CD-ROM drive for latching a target identification data transmitted through said programmable input/output extended device from said host PC, comparing the latched target identification data with the self-identification data output from said target CD-ROM drive and generating a reselect control signal when as a result of the comparison the latched target identification data and the self-identification data match;

a control signal drive buffer means operably connected with the programmable input/output extended device means and operably Connected with the target CD-ROM for driving a command data request signal, the input/output request signal, a busy signal and a request signal outputted from said target CD-ROM drive and an inverted target select signal and a first acknowledge signal to be received by said target CD-ROM drive;

control signal transmitting means, operably connected between said programmable input/output extended device means, said target data transmitting and receiving means, said target identifying means and said control signal drive buffer means, for transmitting the command data request signal, the input/output request signal and the busy signal outputted through said control signal drive buffer means from said target CD-ROM drive directly to said programmable input/output extended device means, for inverting the target select signal from said programmable input/output extended device means and transmitting the inverted target select signal through said control signal drive buffer means to said target CD-ROM drive, and for applying a second acknowledge signal to said programmable input/output extended device means and the first acknowledge signal to said target CD-ROM drive in response to the input buffer full signal, the output buffer full signal and the strobe signal from said programmable input/output extended device means and a data acknowledge signal from said host PC;

interrupt request signal generating means, operably connected between said programmable input/output extended device means, said target identifying means and said control signal transmitting means and operably connectable with the at least one input/output expansion slot of said host PC, for generating an interrupt request signal in response to the request signal from said target CD-ROM drive, the reselect control signal from said target identifying means and a direct memory access signal from said programmable input/output extended device means and for controlling the release of the interrupt request signal in response to the write signal from said host PC, a chip select signal and a reset signal from said host PC being applied to said programmable input/output extended device means;

interface selecting means operably connected with the programmable input/output extended device means and said interrupt request signal generating means and operably connectable with the at least one input/output expansion slot of said host PC and including an interface address setting means for setting of an address of the system for being addressed via the at least one input/output expansion slot of the host PC, for comparing an address set in said interface address setting means with an address output by the host PC for selection of the at least one input/output expansion slot in said host PC and outputting the chip select signal to said programmable input/output extended device means and to said interrupt request signal generating means when the respective addresses are judged the same as a result of the comparison;

data reception control means operably connected with the control signal drive buffer means and with said programmable input/output extended device means and also having a data bus in operable communication with the first and second data ports of said programmable input/output extended device means and with said target data transmitting and receiving means and operably connectable with the at least one input/output expansion slot of said host PC, for generating a data request signal for requesting a direct memory access to the direct memory controller in said host PC in response to the direct memory access signal from said programmable input/output extended device means and the request signal driven by said control signal drive buffer means from said target CD-ROM and for driving the data transmitted through said target data transmitting and receiving means from said target CD-ROM drive in response to the data acknowledge signal from said host PC and the direct memory access signal from said programmable input/output extended device means to transmit the driven data to the direct memory access controller in said host PC; and select switch means operably connected with the control signal transmitting means, the interrupt request signal generating means and the data reception control means and operably connectable with the at least one input/output expansion slot of said host PC, for transmitting the data request signal from said data reception control means, the data acknowledge signal from said host PC and the interrupt request signal from said interrupt request signal generating means and for selecting said at least one direct memory access channel in said host PC corresponding to the data request signal from the data reception control means and the data acknowledge signal from said host PC and for selecting said at least one interrupt level in said host PC corresponding to the interrupt request signal to said host PC from said interrupt request signal generating means.

2. The system of claim 1, wherein said target data transmitting and receiving means comprises:

a bidirectional buffer means having a first bidirectional port for operable connection to the target data port of said target CD-ROM drive and having a second bidirectional port operably connected to the second data port of said programmable input/output extended device means and to the data bus of said data reception control means, for transmitting data bidirectionally between said first and second bidirectional ports in accordance with a direction select signal applied thereto; and a first AND gate means for ANDing the inverted target select signal from said control signal transmitting means and the input/output request signal driven by said control signal drive buffer from said target CD-ROM drive and applying the ANDed signal as the direction select signal to said bidirectional buffer means.

3. The system of claim 1, wherein said target identifying means comprises:

a second AND gate means for ANDing the reselect signal from said programmable input/output extended device means and the busy signal driven by said control signal drive buffer from said target CD-ROM drive and for outputting the ANDed signal as a latch control signal;

a first NOT gate means for inverting the reselect signal from said programmable input/output extended device means;

a first OR gate means for ORing the inverted reselect signal from said first NOT gate means and the busy signal driven by said control signal drive buffer means from said target CD-ROM drive and outputting the ORed signal as a comparator enable signal;

a latch means, in operable communication the second data port of said programmable input/output extended device means, for latching the target identification data outputted through said second data port of said programmable input/output extended device means in response to the latch control signal from said second AND gate means; and a first comparator means in operable communication with said latch means and operably connectable with the target data port of said target CD-ROM drive, for comparing the target identification data latched in said latch means with the self-identification data outputted through said target data port of said target CD-ROM drive in response to the comparator enable signal from said first OR gate means and outputting the reselect control signal when the target identification data and the self-identification data are judged the same as a result of the comparison.

4. The system of claim 1, wherein said control signal transmitting means transmits the command data request signal, the input/output request signal and the busy signal outputted through said control signal drive buffer from said target CD-ROM Drive directly to said programmable input/output extended device means, said control signal transmitting means comprising:

a second NOT gate means for inverting the target select signal from said programmable input/output extended device means and transmitting the inverted target select signal through said control signal drive buffer means to said target CD-ROM drive;

a first NAND gate means for NANDing the input buffer full signal and the strobe signal from said programmable input/output extended device means;

a third NOT gate means for inverting the output buffer full signal from said programmable input/output extended device means and outputting the inverted signal as a first flip-flop clock signal;

a fourth NOT gate means for inverting the request signal outputted through said control signal drive buffer means from said target CD-ROM drive and outputting the inverted request signal as a first flip-flop clear signal;

a first flip-flop means having an inverting output for outputting an inverted control signal in response to the first flip-flop clear signal from said fourth NOT gate means and the first flip-flop clock signal from said third NOT gate means;

a third AND gate means for ANDing the inverted control signal output from said first flip-flop means and the data acknowledge signal transmitted by said select switch means from said host PC;

a fourth AND gate means for ANDing an output signal from said third AND gate means and an output signal from said first NAND gate means and applying the ANDed signal as the first acknowledge signal to said target CD-ROM drive through said control signal drive buffer means;

a second OR gate means for ORing the output buffer full signal from said programmable input/output extended device means and an inverted reselect signal from said programmable input/output extended device means;

a fifth AND gate means for ANDing the inverted control signal output from said first flip-flop means and the inverted target select signal from said second NOT gate means; and a sixth AND gate means for ANDing an output signal from said fifth AND gate means and an output signal from said second OR gate means and applying the ANDed signal as the second acknowledge signal to said programmable input/output extended device means.

5. The system of claim 1, wherein said interrupt request signal generating means comprises:

a seventh AND gate means for ANDing the reselect control signal from said target identifying means and a complement of the request signal outputted through said control signal drive buffer from said target CD-ROM drive;

an eighth AND gate means for ANDing an output signal from said seventh AND gate means and the direct memory access signal from said programmable input/output extended device means and outputting the ANDed signal as a second flip-flop clock signal;

a second flip-flop means for outputting the interrupt request signal in response to the second flip-flop clock signal from said eighth AND gate means;

a third OR gate means for ORing the write signal being applied from said host PC to said programmable input/output extended device means and the chip select signal being applied from said interface selecting means to said programmable input/output extended device means;

a fifth NOT gate means for inverting the reset signal being applied from said host to said programmable input/output extended device means; and a ninth AND gate means for ANDing the inverted reset signal output from said fifth NOT gate means and an output signal from said third OR gate means and applying the ANDed signal as a second flip-flop clear signal to said second flip-flop means.

6. The system of claim 1, wherein said data reception control means comprises:

a NOR gate means for NORing the request signal driven by said control signal drive buffer means from said target CD-ROM drive and the direct memory access signal from said programmable input/output extended device means and outputting the NORed signal as the data request signal for transmission by said select switch means to said host PC;

a fourth OR gate means for ORing the direct memory access signal from said programmable input/output extended device means and the data acknowledge signal transmitted by said select switch means from said host PC and outputting the ORed signal as a buffer enable signal; and a data drive buffer means having a data input port in operable communication with the second bidirectional port of said target data transmitting and receiving means and the second data port of said programmable input/output extended device means and also having a data output port operable for connection with the at least one input/output expansion slot of said host PC, said data drive buffer means being responsive to the enable signal from said fourth OR gate means for driving the data transmitted through said target data transmitting and receiving means from said target CD-ROM drive and transmitting the driven data to the direct memory access controller in said host PC.

7. A method for operably interfacing a host PC (personal computer) system for acting as a host via an input/output expansion bus thereof with at least one target CD-ROM (Compact Disc Read-Only Memory) drive for acting as a target for enabling communication of data therebetween, the input/output expansion bus having a bus free state when the host PC is not operably interfaced thereover with the target CD-ROM drive and a bus busy state when the host PC is operably interfaced thereover with a target CD-ROM drive, the method comprising:

an interface provision step for providing an interface unit in operable connection with the input/output expansion bus of the host PC, the interface unit being addressable by the host PC on said input/output expansion bus;

a target provision step for providing in operable connection with the interface unit the at least one target CD-ROM drive and having a target self-identification data;

an interface addressing step for addressing by the host PC of said interface unit on said input/output expansion bus to thereby operatively interface the interface unit with the host PC for enabling communication of control and data signals therebetween;

a target selection step for, during the bus free state of the input/output expansion bus, enabling communication by the host PC to the interface unit of a target identification data representing an operably connected CD-ROM drive desired to be interfaced as a target with the host PC and for communication by the interface unit of the target identification data to each CD-ROM drive operably connected with the interface unit and having the self-identification data corresponding to the target identification date rendering the input/output bus in condition to assume the bus busy state for thereby operably interfacing said CD-ROM drive with the interface unit for enabling communication of data and control signals therebetween and for thereby operably interfacing said CD-ROM drive as the target with the host PC for the communication of date therebetween via the interface unit;

a command generation step for generating by the host PC and transmitting to the CD-ROM drive acting as the interfaced target of command data representing a command to be executed by said interfaced target, wherein the interfaced target causes the interface unit to generate and communicate an interrupt request to the host PC and whereupon in response the host PC transmits the generated command data to the interface unit and upon reception thereof the interface unit communicates the command data to the interfaced target, and, in the case that the command represented by the command data permits a temporary disconnection of the operable interfacing between the host PC and the CD-ROM drive acting as the target whilst said CD-ROM drive prepares for completion of the command execution and of a subsequent reconnection of the interfacing between such temporarily disconnected CD-ROM drive and the host PC for completion of such command execution, for communicating by the host PC to the interface unit of the target identification data of said currently interfaced CD-ROM drive acting as the target to be permitted of such temporary disconnection and subsequent reconnection and for including by the host PC in said generated command data of a data representing a command for executing a permissive disconnection;

a command execution step for reading by the interfaced target of the command data and in accordance therewith for said target executing the command represented by the command data, and, in accordance with the presence in said command data of a data representing a command for executing a permissive disconnection, for transmitting by said interfaced target to the host PC of a disconnect status data indicative of the execution of said permissive disconnection command and for said target thereafter rendering the input/output expansion bus to assume the bus free state for thereby permissively disconnecting the operable interfacing between the CD-ROM drive acting as the target and the host PC and accordingly for the permissively disconnected CD-ROM drive thereupon preparing for executing the command represented by said command data;

a target reselection step for rendering, during the bus free state of the input/output expansion bus and in accordance with said permissively disconnected CD-ROM drive having prepared for completing execution of the command represented by the command data, for said permissively disconnected CD-ROM drive, the input/output expansion bus to assume the bus busy state and for transmitting by said permissively disconnected CD-ROM drive of its self-identification data to the interface unit and, in accordance therewith, for comparing by the interface unit of said self-identification data with the target identification data transmitted thereto from the host PC during the command generation step and, in accordance with said self-identification data matching said target identification data, for generating and communicating by the interface unit of an interrupt request to the host PC, and for the host PC in accordance therewith causing the interface unit to select said permissively disconnected CD-ROM drive and in accordance with said selection for said CD-ROM drive to temporarily render the input/output expansion bus to assume the bus free state and then again assume the bus busy state for thereby once more operably interfacing said CD-ROM drive as the target with the host PC for the communication of data therebetween via the interface unit;

a data transmit step for transmitting, upon preparation by the CD-ROM drive acting as the target for completing execution of the command represented by the command data and in the case that a permissively disconnected CD-ROM drive is once more operably interfaced as the target with the host PC via the interface unit, data from said interfaced target to the host PC via the interface unit for thereby completing execution of the command represented by the command data; and a status data transmit step for transmitting by said target to the interface unit, upon completion by said interfaced target of the execution of said command represented by the command data, of a status data indicative of the result of the execution by said target of the command represented by said command data, and, in accordance therewith, for the interface unit generating and communicating an interrupt request to the host PC and in accordance therewith for the host PC reading the status data from the interface unit and, in accordance therewith, for said target rendering the input/output expansion bus to assume the bus free state for thereby disconnecting the operable interfacing between the CD-ROM drive acting as target and the host PC.

8. The method of claim 7, wherein in the target provision step a plurality of parallel-connected CD-ROM drives each for acting as a target and each having a target self-identification data are provided in operable connection with the interface unit.

9. The method of claim 7, wherein in the command generation step the data representing the command for executing a permissive disconnection in the command data generated and transmitted by the host PC has a first predetermined value for permitting a disconnection and a second predetermined value for inhibiting a disconnection.

10. The method of claim 9, wherein the data representing the command for executing a permissive disconnection is a disconnect control data bit in a data byte of the command data.

* * * * *